United States Patent [19]

Copenhafer et al.

[11] Patent Number: 4,519,806
[45] Date of Patent: May 28, 1985

[54] ENHANCED RECOVERY OF SODA ASH FROM AQUEOUS SODIUM CARBONATE SOLUTIONS CONTAINING NA₂SO₄- AND NACL

[75] Inventors: William C. Copenhafer, Yardley, Pa.; Michael L. Pinsky, Mount Holly, N.J.

[73] Assignee: Intermountain Research & Development Corp., Green River, Wyo.

[21] Appl. No.: 444,640

[22] Filed: Nov. 26, 1982

[51] Int. Cl.³ .......................... C01D 7/24; C01B 31/24
[52] U.S. Cl. .............................. 23/302 T; 423/419 R; 423/421
[58] Field of Search .................. 23/298, 302 R, 302 T; 423/419 R, 206 T, 421

[56] References Cited

U.S. PATENT DOCUMENTS

| | | | |
|---|---|---|---|
| 1,650,244 | 11/1927 | Sundstrom et al. | 423/421 |
| 1,759,361 | 5/1930 | Miller et al. | 423/206 R |
| 1,810,181 | 6/1931 | MacDonald et al. | 23/298 |
| 1,836,426 | 12/1931 | Allen et al. | |
| 1,853,275 | 4/1932 | Houghton et al. | 423/192 |
| 2,193,817 | 3/1940 | Houghton | 423/192 |
| 2,887,360 | 5/1959 | Hoekje | 423/192 |
| 3,236,590 | 2/1966 | Sopchak et al. | 423/426 |
| 3,314,748 | 4/1967 | Howard et al. | 423/426 |
| 3,493,326 | 2/1970 | Helvenston et al. | 252/175 |
| 3,876,387 | 4/1975 | Coulson | 23/302 R |

OTHER PUBLICATIONS

T. Hou, *Manufacture of Soda*, Hafner Publishing Co., N.Y. 1969, pp. 24–30.

Primary Examiner—Barry S. Richman
Assistant Examiner—Joseph P. Carrier
Attorney, Agent, or Firm—Christopher Egolf

[57] ABSTRACT

A method for enhancing the recovery of dense soda ash from $Na_2SO_4$- and NaCl-containing aqueous sodium carbonate solutions by first co-crystallizing anhydrous sodium carbonate and burkeite and next introducing the co-crystallized solids to an aqueous medium at elevated temperature to dissolve the burkeite and cause reversion of the anhydrous sodium carbonate solids to crystalline sodium carbonate monohydrate, which is then separated from the dissolved sulfate and recovered as product.

13 Claims, 1 Drawing Figure

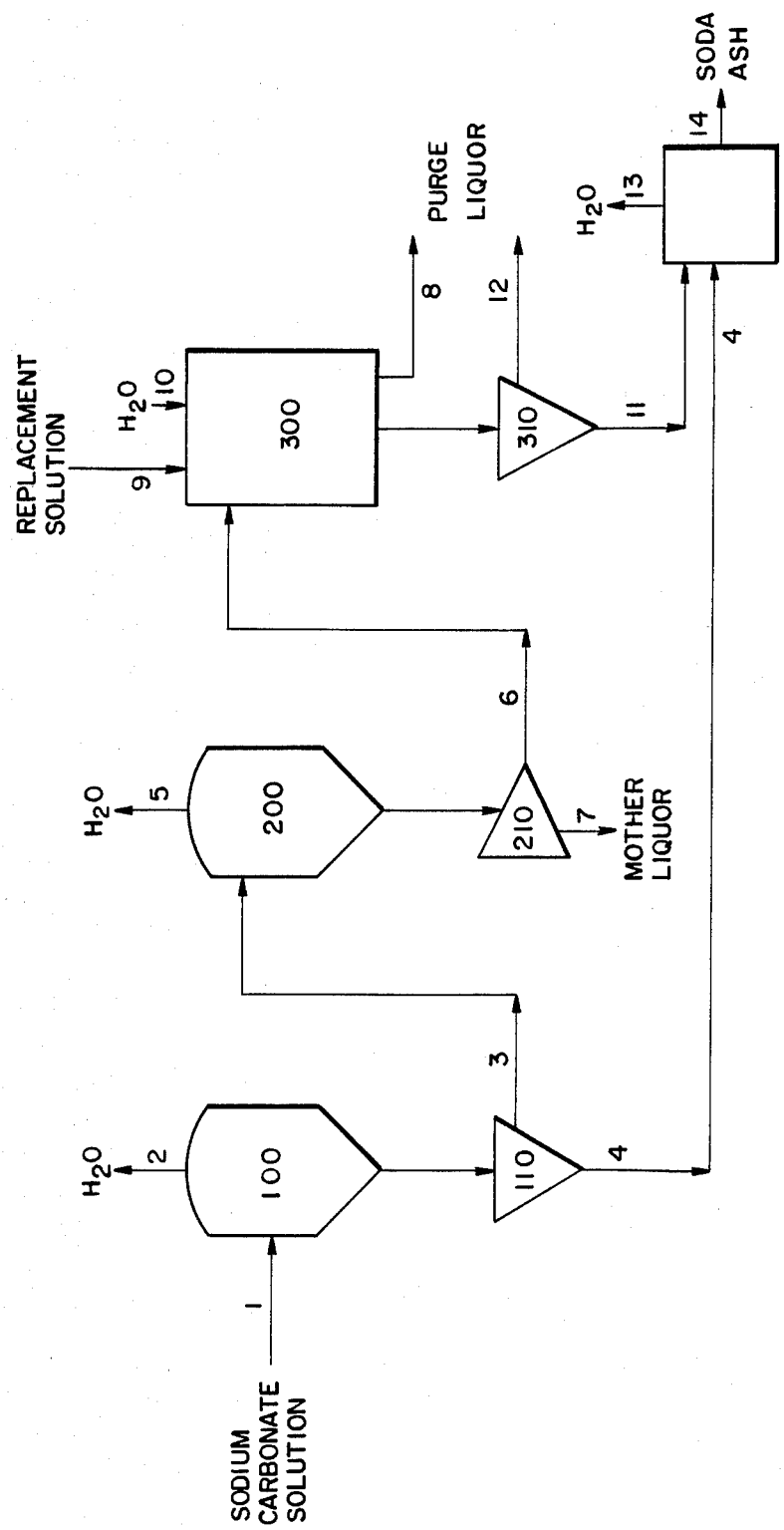

ENHANCED RECOVERY OF SODA ASH FROM AQUEOUS SODIUM CARBONATE SOLUTIONS CONTAINING NA2SO4- AND NACL

BACKGROUND OF THE INVENTION

The method of this invention pertains to the recovery of soda ash, as sodium carbonate monohydrate, from aqueous sodium carbonate solutions also containing sodium sulfate and sodium chloride.

The recovery of soda ash from aqueous sodium carbonate solutions that also contain sodium sulfate, sodium chloride and other salts has been described in connection with treatment procedures applicable to complex natural brines.

U.S. Pat. No. 1,853,275 issued to Houghton et al. describes the selective recovery of sodium carbonate decahydrate from Owens Lake brines containing carbonates, sulfates, chlorides and borates of potassium and sodium. Such brines are first pretreated by adjusting their temperature to about 35° C., in the presence of excess sodium chloride and sodium carbonate, to crystallize burkeite ($Na_2CO_3.2Na_2SO_4$) and thereby reduce the sulfate concentration in the brine. The low sulfate brine is then chilled to crystallize sodium carbonate decahydrate, which is recovered. To remove all traces of sulfate, the recovered decahydrate is recrystallized as sodium carbonate monohydrate.

U.S. Pat. No. 2,193,817, issued to Houghton, discloses an improvement in the Houghton et al. '275 decahydrate process in which sodium carbonate heptahydrate is crystallized at low temperature from NaCl-saturated brines to minimize co-crystallization of sulfate with the hydrated carbonate product.

Several drawbacks are associated with the low temperature cooling crystallizations utilized by these prior art processes. Refrigeration requirements may be costly, and particularly for NaCl- and $Na_2SO_4$-containing carbonate solutions that are hot, cooling such solutions is economically inappropriate. Recovery of a dense soda ash requires that the recovered decahydrate or heptahydrate solids be recrystallized, at elevated temperature, to form sodium carbonate monohydrate or anhydrous sodium carbonate.

Recovery efficiencies of sodium carbonate by these procedures are not high: the Houghton et al. '275 method fails to recover any sodium carbonate values contained in the burkeite ($Na_2CO_3.2Na_2SO_4$) that is initially crystallized, and sodium carbonate yields in the Houghton '817 method are limited by the high NaCl content required for the crystallization solution.

The method of the present invention provides for the efficient recovery of a dense soda ash, as relatively pure sodium carbonate monohydrate, from $Na_2SO_4$- and NaCl-containing sodium carbonate solutions.

SUMMARY OF THE INVENTION

In accordance with the present invention, soda ash is recovered in enhanced yields from aqueous sodium carbonate solutions also containing sodium sulfate and sodium chloride by the continuous method which comprises (i) co-crystallizing anhydrous sodium carbonate ($Na_2CO_3$) and burkeite ($Na_2CO_3.2Na_2SO_4$) by evaporative crystallization, at a temperature above the anhydrous-monohydrate transition temperature, of an aqueous sodium carbonate feed solution also containing sodium sulfate and sodium chloride, such solution being unsaturated with respect to sodium chloride and having an $NaCl:Na_2SO_4$ weight ratio less than 37:1 and an $NaCl:Na_2CO_3$ weight ratio less than 2.2:1;

(ii) separating the crystallized solids from the crystallization slurry;

(iii) introducing the crystallized solids into a well-mixed aqueous medium, maintained at a temperature below the anhydrous-monohydrate transition temperature, that is substantially saturated with respect to sodium carbonate monohydrate, unsaturated with respect to burkeite, and contains less than that amount of sodium chloride which would result in crystallization of anhydrous sodium carbonate, so as to effect dissolution of the burkeite and reversion of the anhydrous sodium carbonate to crystalline sodium carbonate monohydrate ($Na_2CO_3.H_2O$);

(iv) separating the sodium carbonate monohydrate solids in the aqueous medium from its mother liquor to thereby recover a relatively pure soda ash; and (v) purging mother liquor from the aqueous medium and replacing such purged liquor with water or other aqueous solution in amounts sufficient to maintain the aqueous phase of the aqueous medium at a relatively constant composition.

The method of this invention is particularly suited to aqueous sodium carbonate feed solutions containing 10–31 wt % $Na_2CO_3$, and to feed solutions containing 0.1–8 wt % $Na_2SO_4$, and 0.1–22 wt % NaCl.

The evaporative co-crystallization to form the burkeite-anhydrous sodium carbonate slurry is desirably performed at a temperature of from 85°–140° C. The co-crystallization is preferably carried out so as to yield a crystallization slurry whose mother liquor is nearly saturated with respect to sodium chloride.

The reversion step, for converting the anhydrous sodium carbonate in the burkeite-anhydrous sodium carbonate mixture to sodium carbonate monohydrate and for dissolving the burkeite in the aqueous medium, is desirably performed at a temperature of from 40°–109° C., and more preferably from 85°–105° C.

The method is preferably operated such that the aqueous solution replacing the purged mother liquor from the reversion operation is a sodium carbonate solution, preferably concentrated. Such concentrated sodium carbonate replacement solutions may also contain sodium sulfate and sodium chloride, provided their concentration levels are less than those of the purged liquor.

In a preferred embodiment of the invention, the evaporative co-crystallization of burkeite and anhydrous sodium carbonate from the $Na_2SO_4$- and NaCl-containing aqueous sodium carbonate solution is desirably preceded by the evaporative crystallization of sodium carbonate monohydrate without co-crystallization of burkeite and/or sodium chloride.

The recovered sodium carbonate monohydrate is desirably dried to obtain a dry, free-flowing, substantially anhydrous, dense soda ash.

BRIEF DESCRIPTION OF THE DRAWING

The drawing is a schematic flow diagram that illustrates the method of the present invention, in which soda ash is recovered from a $Na_2SO_4$- and NaCl-contaminated sodium carbonate feed solution, from which sodium carbonate monohydrate has been crystallized in a preliminary step.

DETAILED DESCRIPTION

The method of the present invention is applicable to aqueous sodium carbonate solutions that also contain sodium chloride and sodium sulfate in more than trace or minor concentrations. Other inorganic salts, e.g., sodium bicarbonate, magnesium, calcium or potassium salts, or organic impurities may also be present in minor amounts.

The preferred sodium carbonate concentrations in suitable feed solutions range from about 10 to 31 wt % $Na_2CO_3$. It should be evident, however, that the method can also be employed with more dilute carbonate solutions, which may be concentrated via evaporation or through the addition of sodium carbonate.

The sodium sulfate and sodium chloride levels in these sodium carbonate solutions must be such that the feed solution can be characterized as being unsaturated with respect to sodium chloride and as having a weight ratio of sodium chloride:sodium sulfate that is less than 37:1 $NaCl:Na_2SO_4$ and of sodium chloride:sodium carbonate that is less than 2.2:1 $NaCl:Na_2CO_3$.

The sodium carbonate solutions suitable for use in this invention contain dissolved sodium chloride in concentrations of less than a saturation level, as stated above. Sodium chloride concentrations are preferably within the range of from about 0.1 to 22 wt % NaCl, most preferably about 1 to 10 wt. % NaCl.

The sodium sulfate dissolved in the aqueous sodium carbonate solutions treated by this invention is typically present in concentrations of from about 0.1 to 8 wt % $Na_2SO_4$. The sodium sulfate concentrations are preferably within the range of from about 0.2 to 4 wt % $Na_2SO_4$.

Aqueous sodium carbonate solutions, also containing sodium sulfate and sodium chloride, may be obtained from any of several sources. Purge or waste streams from "monohydrate" or "sesquicarbonate" soda ash operations, or the alkali holding ponds used to collect such aqueous liquor, are one source. Alkaline waste streams from flue gas desulfurization scrubber operations are another. Aqueous solutions obtained from solution mining of subterranean trona or nahcolite ore deposits can be yet another source of sodium carbonate solutions that also contain sodium sulfate and sodium chloride.

The concentration ranges specified for sodium carbonate, sodium sulfate and sodium chloride are applicable as constraints on the aqueous solution being introduced continuously as feed to the evaporative co-crystallization step. It should be understood that such solution may include recycled crystallizer liquor.

The recovery of dense soda ash from such feed solutions, as a relatively pure sodium carbonate monohydrate, is the primary objective of this invention. It has been discovered that this objective can be achieved in an efficient, economical manner in two essential process steps.

The $Na_2SO_4$- and NaCl-containing sodium carbonate feed solution is treated in a first step in a manner which produces a crystal mixture free of solid NaCl, leaving behind a crystallizer liquor containing essentially all of the unwanted sodium chloride. In a second step, the crystal mixture is treated to crystallize sodium carbonate monohydrate as product, leaving virtually all of the sulfate contained in the crystal mixture dissolved in a second aqueous liquor.

In the first step, burkeite ($Na_2CO_3 \cdot 2Na_2SO_4$) and anhydrous sodium carbonate ($Na_2CO_3$) are co-crystallized by evaporative crystallization of an appropriate aqueous sodium carbonate feed solution at a temperature above the transition temperature for anhydrous sodium carbonate and sodium carbonate monohydrate. The co-crystallization is preferably performed at a temperature of from about 85° to 140° C. It should be noted that the anhydrous-monohydrate transition temperature is approximately 109° C. for NaCl-free aqueous sodium carbonate solutions but will decrease as the sodium chloride content of the solution increases.

Conventional evaporative crystallizers may be employed for the co-crystallization step, and such evaporators may have multiple effects.

The evaporative co-crystallization is carried out on an appropriate feed solution so as to avoid co-crystallization of sodium chloride in the crystallization slurry. In a preferred embodiment, a crystallization slurry is produced whose mother liquor is nearly saturated with respect to sodium chloride but in any event below a salt concentration at which sodium chloride would co-crystallize along with anhydrous sodium carbonate and burkeite. The co-crystallization is most preferably carried out so as to yield a crystallization slurry whose mother liquor contains about 10 wt % $Na_2CO_3$, about 22.2 wt % NaCl and about 0.6 wt % $Na_2SO_4$, typically at a crystallization temperature of about 100° C.

The crystal slurry of burkeite and anhydrous sodium carbonate that results from this co-crystallization operation is separated from its mother liquor by conventional solids-liquid separation techniques, e.g., filtration, centrifugation, decanting or the like.

The separated crystal solids, burkeite and anhydrous sodium carbonate, are introduced in the next process step into a well-mixed or well-stirred aqueous medium at elevated temperature to effect a reversion of the anhydrous sodium carbonate to crystalline sodium carbonate monohydrate ($Na_2CO_3 \cdot H_2O$). The well-mixed aqueous medium is maintained at a temperature below the anhydrous-monohydrate transition temperature and is characterized by being substantially saturated with respect to sodium carbonate monohydrate, and containing less than that amount of sodium chloride which would result in crystallization of anhydrous sodium carbonate.

Particular advantages of this reversion procedure are (i) that a relatively pure soda ash product is obtained, with impurities being left behind in the aqueous phase of the reversion medium, and (ii) that the reversion "reaction" requires relatively little energy input, as compared with conventional evaporative crystallization processes.

The temperature of the aqueous reversion medium is preferably maintained at a temperature of from about 40° to 109° C., more preferably from 85° to 105° C. At the preferred temperatures, the reversion of the anhydrous sodium carbonate in the aqueous medium into crystalline sodium carbonate monohydrate is relatively rapid and substantially complete. The burkeite crystals, moreover, are also quickly dissolved in the aqueous medium, leaving a slurry of crystalline sodium carbonate monohydrate that is relatively sulfate-free.

The temperature of the burkeite-anhydrous sodium carbonate crystal mixture that is introduced to the aqueous reversion medium may be higher than the operative temperature of the aqueous medium, so as to facilitate a rapid reversion of the anhydrous sodium carbonate crystalline feed. A preferred crystal feed mixture temperature range is from about 85°–140° C.

The aqueous medium in the reversion operation, besides being saturated with respect to sodium carbonate monohydrate, must also be unsaturated with respect to burkeite; this causes the burkeite in the crystal solids mixture to dissolve when fed into the aqueous medium. The sodium chloride content of aqueous medium must also be maintained at a relatively low concentration; if the anhydrous-monohydrate transition point is lowered (by the presence of high NaCl concentrations) below the operating temperature of the reversion medium, the reversion medium cannot be saturated with respect to sodium carbonate monohydrate.

The aqueous medium in the reversion step is preferably maintained at a slurry density of from 20–50 wt %, most preferably 25–40 wt %. The slurry density may be adjusted via the rate of aqueous mother liquor (solids-free solution) that is purged from the reversion tank and/or recycled back to the reversion tank after recovery of crystalline sodium carbonate monohydrate.

The levels of burkeite and sodium chloride dissolved in the aqueous medium are maintained at the desired, relatively constant concentrations by purging a portion of (substantially solids-free) mother liquor from the aqueous medium. The preferred amount or rate of purge is that which removes the same quantity of sodium sulfate and sodium chloride as is concurrently introduced with the burkeite-anhydrous sodium carbonate crystal mixture being fed to the reversion step. The purge should be replaced with an amount of water or other aqueous solution that corresponds to the amount of water in the mother liquor purged.

A preferred alternative to replacement of the volume of purged mother liquor with water is the use of an aqueous sodium carbonate solution, which replaces carbonate values otherwise lost with the purge. Such sodium carbonate make-up solution may be available as a waste or (second) purge stream in process operations that are carried out in process plants located nearby, e.g., a conventional monohydrate or sesquicarbonate soda ash facility.

The replacement aqueous sodium carbonate solution, added in lieu of the volume of purged liquor may also contain sodium sulfate and/or sodium chloride, provided however that such amounts/concentrations of these two are less than the amounts/concentrations removed with the purged mother liquor. This ensures that the sodium sulfate and sodium chloride concentrations in the reversion medium will remain relatively constant and not increase.

The crystal slurry from the aqueous medium of the reversion step is treated via conventional solids—liquids separation techniques to separate the sodium carbonate monohydrate crystalline product. The separated crystals are preferably washed, e.g., with water, to remove residual mother liquor, which is a significant source of impurities in the recovered product. Mother liquor and wash liquor, if any, are generally returned to the reversion tank.

The crystalline monohydrate is characterized by its good crystal habit: blocky, well-shaped crystals of good size distribution are formed and these yield a dense soda ash product when dried. The separated sodium carbonate monohydrate crystals are then preferably dried, e.g., in a fluidized bed dryer, to yield a free-flowing, substantially anhydrous (water-free) dense soda ash product.

The soda ash product of this invention, which is recovered from an aqueous carbonate solution contaminated with both sodium sulfate and sodium chloride, is characterized by relatively high purity, typically containing less than 0.15 wt % $Na_2SO_4$ and less than 0.15 wt % NaCl.

As a preliminary step in a preferred embodiment of this invention, either sodium carbonate monohydrate or anhydrous sodium carbonate may be crystallized by evaporative crystallization from the aqueous sodium carbonate feed solution. This step is carried out prior to co-crystallization of burkeite and anhydrous sodium carbonate according to the method of this invention.

The crystallized species, anhydrous sodium carbonate or sodium carbonate monohydrate, is separated in this preliminary step from the feed solution prior to the co-crystallization. The separated crystals, if they are sodium carbonate monohydrate, may be combined with the monohydrate product that is subsequently recovered from the reversion operation.

EXAMPLE 1

Example 1 illustrates the method of this invention in a preferred continuous technique which involves crystallizing sodium carbonate monohydrate, as a preliminary step, and then recovering additional sodium carbonate monohydrate from the resultant $Na_2SO_4$- and NaCl-containing crystallizer liquor. The overall continuous process is shown in the schematic flow diagram of the drawing.

Sodium carbonate solution 1 containing 25 wt % $Na_2CO_3$, 1 wt % $Na_2SO_4$ and 1 wt % NaCl, is continuously introduced into a conventional evaporator 100 operated at a temperature of about 100° C. The sodium carbonate solution 1 is fed into the crystallizer 100 at a rate of 1000 kg/hr. Water 2 is evaporated at a rate of 446 kg/hr, to crystallize sodium carbonate monohydrate and yield a mother liquor 3 containing 27.2 wt % $Na_2CO_3$, 2.6 wt % $Na_2SO_4$ and 2.6 wt % NaCl. The monohydrate crystals 4 are separated from the mother liquor 3 in a centrifuge 110 and recovered as a damp cake at a rate of about 179 kg/hr, of which about 5% is mother liquor.

Mother liquor 3 is continuously introduced, as feed solution, to the burkeite/anhydrous sodium carbonate co-crystallizer 200 at a rate of about 376 kg/hr. Such feed solution 3, at a temperature of about 100° C., is unsaturated with respect to salt, containing only 2.6 wt % NaCl, and is further characterized by having weight ratios of 1:1 NaCl:$Na_2SO_4$ and 0.1:1 NaCl:$Na_2CO_3$.

Co-crystallization of burkeite and anhydrous sodium carbonate from the feed solution 3 is carried out at a temperature of about 108° C. in the co-crystallizer 200. Water 5 is evaporated from the co-crystallization slurry at a rate of 224 kg/hr.

The co-crystallization slurry is continuously withdrawn and passed through a centrifuge 210 to separate a damp crystal mixture 6 of burkeite and anhydrous sodium carbonate, containing 12 wt % burkeite, 84 wt % anhydrous sodium carbonate, and 4 wt % mother liquor, from the crystallizer liquor 7. The crystallizer mother liquor 7 containing 10 wt % $Na_2CO_3$, 22.2 wt % NaCl and 0.6 wt % $Na_2SO_4$, is discarded. Damp crystals 6 and crystallizer mother liquor 7 are produced at a rate of 113 kg/hr and 39 kg/hr, respectively.

The damp crystal mixture 6 is fed continuously to a reversion tank 300, fitted with an agitator and containing an aqueous slurry (35 wt % solids) at a temperature of 100° C. As the crystal mixture 6 enters the reversion tank slurry, anhydrous sodium carbonate crystals therein are rapidly converted to crystalline sodium carbonate monohydrate. Burkeite crystals in the mixture 6 are dissolved in the reversion tank aqueous phase, so that the crystalline sodium carbonate monohydrate is free of solid sulfate.

The aqueous phase of the reversion tank slurry contains about 28.7 wt % $Na_2CO_3$, 2.9 wt % $Na_2SO_4$ and 0.8 wt % NaCl. A portion 8 of the reversion tank liquor is continuously purged or removed, at a rate of about 164 kg/hr, to maintain a constant liquor composition and slurry density and to prevent the buildup of sodium chloride and sodium sulfate.

Concentrated sodium carbonate solution 9, containing 30 wt % $Na_2CO_3$ and small amounts of sodium chloride and sodium sulfate (0.5 wt % of each) is added as replacement solution for the purge stream 8 to maintain the proper water balance and minimize the loss of alkali values ($Na_2CO_3$) via the purge. This concentrated sodium carbonate solution 9, a waste stream diverted from a nearby soda ash facility, is introduced at a rate of 380 kg/hr, along with 17 kg/hr water 10 to compensate for that removed with the hydrated product.

Reversion of the anhydrous sodium carbonate to the monohydrate and dissolution of burkeite in the crystal mixture 6 fed to the reversion tank 300 are generally rapid and complete. The solids portion of the aqueous reversion slurry is therefore essentially pure sodium carbonate monohydrate, free of solid sulfate and relatively low in sulfate impurities.

Sodium carbonate monohydrate crystals 11 are separated and recovered from the reversion tank with a centrifuge 310, at a rate of 122 kg/hr, containing about 5% mother liquor. Centrifuged mother liquor 12 is discarded as purge solution at a rate of 223 kg/hr, to maintain a constant liquor composition in the reversion tank. This purge 12 is in addition to the reversion tank liquor purge 8, mentioned previously.

The centrifuged monohydrate crystals 11, 4 from the previous step and the preliminary crystallization procedure first described are water-washed (not shown), then dried at a temperature of about 120° C. in a fluid bed drier 400 to remove water 13 and yield a free-flowing, substantially anhydrous, dense soda ash product 14.

Soda ash recovered from the preliminary crystallization of sodium carbonate monohydrate described above amounts to 145 kg/hr (as $Na_2CO_3$); this is soda ash recovered from the centrifuged crystals 4 after drying. This is typically the maximum amount of soda ash that may be recovered from the feed solution 1 by conventional evaporative crystallization techniques.

Additional soda ash is recovered by the two-step procedure of this invention, from centrifuged crystals 11, in an amount of 99 kg/hr (as $Na_2CO_3$). Of this, only 1 kg/hr $Na_2CO_3$ is derived from the $Na_2CO_3$-containing purge replacement solution; the remaining 98 kg/hr $Na_2CO_3$ is recovered from the NaCl- and $Na_2SO_4$-containing feed solution 3, that was mother liquor from the preliminary monohydrate crystallization step.

The overall improvement in soda ash recovery, over that recovered in the preliminary step, is $(98/145) \times 100 = 68\%$, a significant additional yield.

COMPARATIVE EXAMPLE

The advantages of the soda ash recovery method described in Example 1 are evident when compared to cooling crystallization processes utilized in the prior art.

In this comparative example, the sodium carbonate solution designated as stream 3 in Example 1, containing 27.2 wt % $Na_2CO_3$, 2.6 wt % $Na_2SO_4$ and 2.6 wt % NaCl, is subjected to a cooling crystallization at 20° C. to form sodium carbonate decahydrate. In the cooling crystallization, 376 kg/hr of feed solution are introduced to the crystallizer to yield centrifuged, damp sodium carbonate decahydrate at a rate of 250 kg/hr, of which about 5% is mother liquor. The mother liquor composition is about 13.1 wt % $Na_2CO_3$, 9 wt % $Na_2SO_4$ and 9 wt % NaCl.

The damp crystalline sodium carbonate decahydrate must be recrystallized, to form sodium carbonate monohydrate, for two reasons. Sodium carbonate decahydrate, when dried, does not yield a dense soda ash. Second, the decahydrate crystals formed by the cooling crystallization described above still contain a moderate level of sulfate impurities, and recrystallization is needed to yield a sulfate-free soda ash product.

The cold damp decahydrate crystals are therefore heated to melt them in their water of hydration, diluted with additional water, and introduced to an evaporative crystallizer, at a temperature of 100° C., to form sodium carbonate monohydrate. The crystallizer yields a mother liquor, containing 27.2 wt % $Na_2CO_3$, 2.6 wt % $Na_2SO_4$ and 2.6 wt % NaCl, which must be purged at a rate of 37 kg/hr.

Crystalline sodium carbonate monohydrate is separated from the monohydrate crystallizer slurry and centrifuged to yield damp crystals at a rate of about 96 kg/hr, containing about 5% mother liquor. These damp crystals are dried, yielding 78 kg/hr soda ash (as $Na_2CO_3$).

This soda ash yield is significantly less than that of Example 1, being only about 80% of that recovered by the method of the invention described in Example 1.

EXAMPLE 2

Example 2 illustrates the method of this invention using a sodium carbonate feed solution much higher in sodium chloride than that for Example 1. Example 2 also differs from Example 1 in that there is no preliminary step of crystallizing sodium carbonate monohydrate.

The feed solution, containing 22.1 wt % $Na_2CO_3$, 0.7 wt % $Na_2SO_4$ and 8 wt % NaCl, is continuously introduced to a burkeite/anhydrous sodium carbonate co-crystallizer at a rate of 473 kg/hr. Despite the high level of salt, the feed solution is unsaturated with respect to sodium chloride and is characterized by having weight ratios of 11.4:1 NaCl:$Na_2SO_4$ and 0.4:1 NaCl:$Na_2CO_3$.

Co-crystallization of burkeite and anhydrous sodium carbonate is carried out at a temperature of 107° C., with water being evaporated at a rate of 184 kg/hr. The co-crystallized slurry is continuously withdrawn and a moist crystal mixture, containing 2 wt % burkeite, 69 wt % anhydrous sodium carbonate, and 29 wt % mother liquor, is separated from the mother liquor by centrifugation at a rate of 103 kg/hr. Mother liquor, containing 15.4 wt % $Na_2CO_3$, 0.9 wt % $Na_2SO_4$ and 17.5 wt % NaCl, is discarded at a rate of 186 kg/hr.

The hot, moist crystal mixture is fed continuously to a reversion tank containing an aqueous slurry at a temperature of 100° C. The aqueous phase of the reversion aqueous medium contains 25.1 wt % $Na_2CO_3$, 1.6 wt % $Na_2SO_4$ and 4.8 wt % NaCl.

A portion of reversion aqueous phase is continuously purged, and discarded, at a rate of 119 kg/hr, to maintain a constant liquor composition without buildup of sodium sulfate and sodium chloride. To compensate for the water (and sodium carbonate) lost in the purge stream, replacement solution containing 32 wt % $Na_2CO_3$, 0.5 wt % $Na_2SO_4$ and 0.5 wt % NaCl is added to the reversion tank at a rate of 118 kg/hr.

The reversion tank slurry is removed, and the sodium carbonate monohydrate crystals recovered at a rate of 102 kg/hr, of which about 4% is mother liquor. Mother liquor separated from the crystals is recycled to the reversion tank at a rate of 124 kg/hr; as mentioned above, an additional 119 kg/hr mother liquor are diverted and purged.

The damp crystals of sodium carbonate monohydrate are air-dried at a temperature of about 120° C. in a fluid bed drier to yield a dry, free-flowing, substantially water-free, dense soda ash, at a rate of 85 kg/hr (as $Na_2CO_3$). The soda ash product is relatively pure, containing only 0.1 wt % $Na_2SO_4$ and 0.2 wt % NaCl.

We claim:

1. A continuous method for enhancing the recovery of dense soda ash from aqueous sodium carbonate solutions also containing sodium sulfate and sodium chloride which comprises
   (i) co-crystallizing anhydrous sodium carbonate and burkeite, without precipitation of sodium chloride, by evaporative crystallization at a temperature above the anhydrous-monohydrate transition temperature, of an aqueous sodium carbonate feed solution also containing sodium sulfate and sodium chloride, such solution being unsaturated with respect to sodium chloride and having an $NaCl:Na_2SO_4$ weight ratio less than 37:1 and an $NaCl:Na_2CO_3$ weight ratio less than 2.2:1;
   (ii) separating the crystallized solids from the crystallization slurry;
   (iii) introducing the crystallized solids into a well-mixed aqueous medium, maintained at a temperature below the anhydrous-monohydrate transition temperature, that is substantially saturated with respect to sodium carbonate monohydrate, unsaturated with respect to burkeite, and contains less than that amount of sodium chloride which would result in crystallization of anhydrous sodium carbonate, so as to effect dissolution of the burkeite and reversion of the anhydrous sodium carbonate to crystalline sodium carbonate monohydrate;
   (iv) separating the sodium carbonate monohydrate solids in the aqueous medium from its mother liquor to thereby recover a relatively pure soda ash; and
   (v) purging mother liquor from the aqueous medium and replacing such purged liquor with water or other aqueous solution containing sodium carbonate in amounts sufficient to maintain the aqueous phase of the aqueous medium at a relatively constant composition.

2. The method of claim 1 wherein the aqueous sodium carbonate feed solution contains from 10 to 31 wt % $Na_2CO_3$.

3. The method of claim 1 wherein the aqueous sodium carbonate feed solution contains from 0.1 to 8 wt % $Na_2SO_4$ and from 0.1 to 22 wt % NaCl.

4. The method of claim 1 wherein the evaporative co-crystallization of anhydrous sodium carbonate and burkeite is performed at a temperature of from 85° to 140° C.

5. The method of claim 1 wherein the evaporative co-crystallization of anhydrous sodium carbonate and burkeite is carried out so as to yield a crystallization slurry whose mother liquor is nearly saturated with respect to sodium chloride.

6. The method of claim 1 wherein the evaporative co-crystallization of anhydrous sodium carbonate and burkeite is carried out so as to yield a crystallization slurry whose mother liquor contains about 10 wt % $Na_2CO_3$, 22.2 wt % NaCl and 0.6 wt % $Na_2SO_4$.

7. The method of claim 1 wherein the aqueous medium during the reversion step is maintained at a temperature of from 40° to 109° C.

8. The method of claim 1 wherein the aqueous medium during the reversion step is maintained at a temperature of from 85° C. to 105° C.

9. The method of claim 1 wherein the replacement solution is concentrated with respect to sodium carbonate and also contains sodium sulfate or sodium chloride or both, at concentration levels less than those of the purged mother liquor.

10. The method of claim 1 which further comprises drying the separated sodium carbonate monohydrate crystals to obtain a dry free-flowing, substantially anhydrous, dense soda ash.

11. The method of claim 1 which further comprises, as a preliminary step, crystallizing anhydrous sodium carbonate by evaporative crystallization from the aqueous sodium carbonate feed solution and separating such crystallized anhydrous sodium carbonate from the crystallization slurry, prior to co-crystallization of anhydrous sodium carbonate and burkeite.

12. The method of claim 1 which further comprises, as a preliminary step, crystallizing sodium carbonate monohydrate by evaporative crystallization from the aqueous sodium carbonate feed solution and separating such crystallized sodium carbonate monohydrate from the crystallization slurry, prior to co-crystallization of anhydrous sodium carbonate and burkeite.

13. The method of claim 12 which further comprises drying the separated sodium carbonate monohydrate crystals to obtain a dry free-flowing, substantially anhydrous, dense soda ash.

* * * * *